US010140570B2

(12) United States Patent
Gulas

(10) Patent No.: US 10,140,570 B2
(45) Date of Patent: Nov. 27, 2018

(54) MICROPROCESSOR-CONTROLLED TAMPER DETECTION SYSTEM

(71) Applicant: William P Gulas, Birmingham, AL (US)

(72) Inventor: William P Gulas, Birmingham, AL (US)

( * ) Notice: Subject to any disclaimer, the term of this patent is extended or adjusted under 35 U.S.C. 154(b) by 0 days.

(21) Appl. No.: 15/871,492

(22) Filed: Jan. 15, 2018

(65) Prior Publication Data
US 2018/0148241 A1 May 31, 2018

Related U.S. Application Data

(63) Continuation-in-part of application No. 15/239,744, filed on Aug. 17, 2016.
(Continued)

(51) Int. Cl.
| | |
|---|---|
| *G06K 19/077* | (2006.01) |
| *B65D 79/00* | (2006.01) |
| *B32B 15/09* | (2006.01) |
| *B32B 27/36* | (2006.01) |
| *G08B 13/24* | (2006.01) |
| *B32B 15/20* | (2006.01) |

(Continued)

(52) U.S. Cl.
CPC ........ *G06K 19/07798* (2013.01); *B32B 15/09* (2013.01); *B32B 15/20* (2013.01); *B32B 27/36* (2013.01); *B65D 27/30* (2013.01); *B65D 79/00* (2013.01); *G06F 21/86* (2013.01); *G08B 13/24* (2013.01); *H01L 23/573* (2013.01); *B32B 2250/244* (2013.01); *B32B 2255/10* (2013.01); *B32B 2255/205* (2013.01); *B32B 2307/202* (2013.01); *B32B 2307/206* (2013.01); *B32B 2307/518* (2013.01); *B32B 2307/54* (2013.01); *B32B 2307/546* (2013.01);
(Continued)

(58) Field of Classification Search
CPC ........ G06K 19/07798; G06K 19/07722; B32B 27/08; B32B 15/09; B32B 15/20; B32B 27/36; B32B 2250/244; B32B 2255/10; B32B 2255/205; B32B 2307/202; B32B 2307/206; B32B 2307/518; B32B 2307/54; B32B 2439/40; B65D 79/00
See application file for complete search history.

(56) References Cited

U.S. PATENT DOCUMENTS

| | | | | |
|---|---|---|---|---|
| 4,593,384 A | * | 6/1986 | Kleijne | G06F 21/87 235/487 |
| 7,982,604 B2 | * | 7/2011 | Nichols | G06Q 10/08 340/541 |

(Continued)

*Primary Examiner* — Thomas Alunkal
(74) *Attorney, Agent, or Firm* — Patent Grove LLC; Tomas Friend

(57) ABSTRACT

A microprocessor-controlled tamper evident wrapping system detects tampering and records data related to a tampering event. Upon sealing an object or material within a layered composite material comprising alternating nonconducting and conducting layers, one or more microprocessors electrically coupled to conducting layers of the composite material arm the system and initiates a clock function. If the package is punctured, cut, or otherwise damaged, that event is detected and recorded by the microprocessor(s) and a reset function is activated for the next potential event. The system may be interrogated by a user to view and download a tampering event log, which may provide time, date, location, and/or other parameters associated with tampering events.

12 Claims, 11 Drawing Sheets

Related U.S. Application Data

(60) Provisional application No. 62/233,662, filed on Sep. 28, 2015, provisional application No. 62/206,596, filed on Aug. 18, 2015.

(51) Int. Cl.
  *B65D 27/30*   (2006.01)
  *G06F 21/86*   (2013.01)
  *H01L 23/00*   (2006.01)

(52) U.S. Cl.
  CPC ....... *B32B 2439/62* (2013.01); *B32B 2457/10* (2013.01); *B65D 2101/00* (2013.01); *B65D 2101/0092* (2013.01)

(56) References Cited

U.S. PATENT DOCUMENTS

| | | | |
|---|---|---|---|
| 8,970,247 B2* | 3/2015 | Oomura | H01L 23/576 324/762.03 |
| 2005/0225445 A1* | 10/2005 | Petersen | B65D 5/42 340/568.2 |
| 2005/0242957 A1* | 11/2005 | Lindsay | G06K 19/0716 340/572.7 |
| 2006/0049941 A1* | 3/2006 | Hunter | G01R 22/066 340/545.6 |
| 2006/0086534 A1* | 4/2006 | Oggioni | H05K 1/0275 174/261 |
| 2008/0036598 A1* | 2/2008 | Oggioni | G06F 21/87 340/568.1 |
| 2010/0187527 A1* | 7/2010 | Van Geloven | H01L 23/576 257/48 |
| 2011/0031985 A1* | 2/2011 | Johnson | G06F 21/86 324/681 |
| 2011/0083975 A1* | 4/2011 | McGrane | B65D 75/20 206/1.5 |
| 2012/0038374 A1* | 2/2012 | Johnson | G01M 3/045 324/694 |
| 2013/0147625 A1* | 6/2013 | Sayegh | G08B 13/2451 340/568.2 |
| 2014/0305828 A1* | 10/2014 | Salvo | G08B 13/1654 206/459.1 |

* cited by examiner

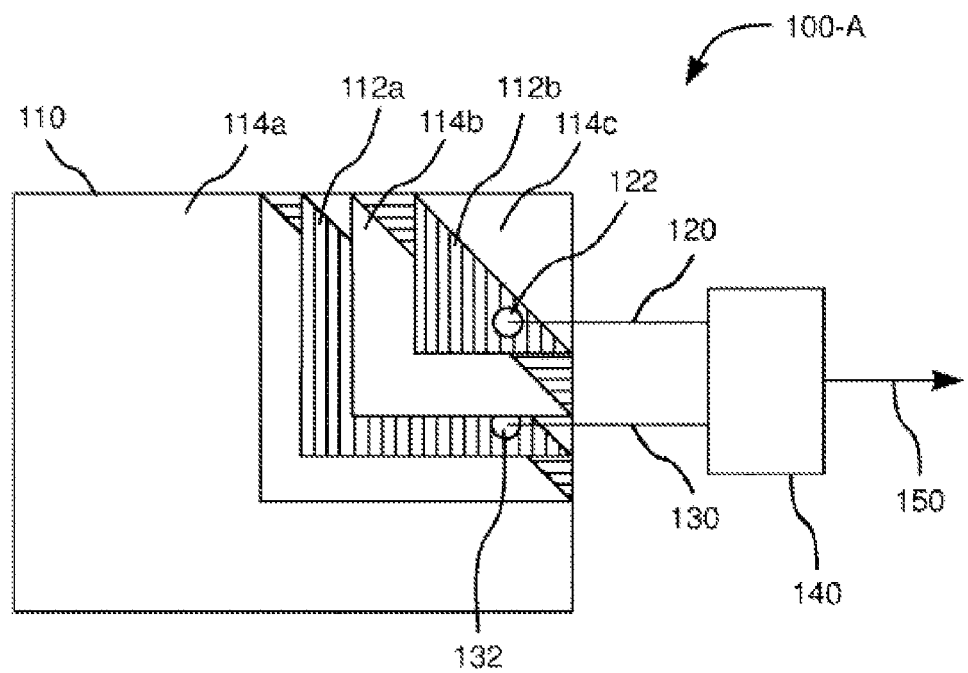
Fig. 2-A
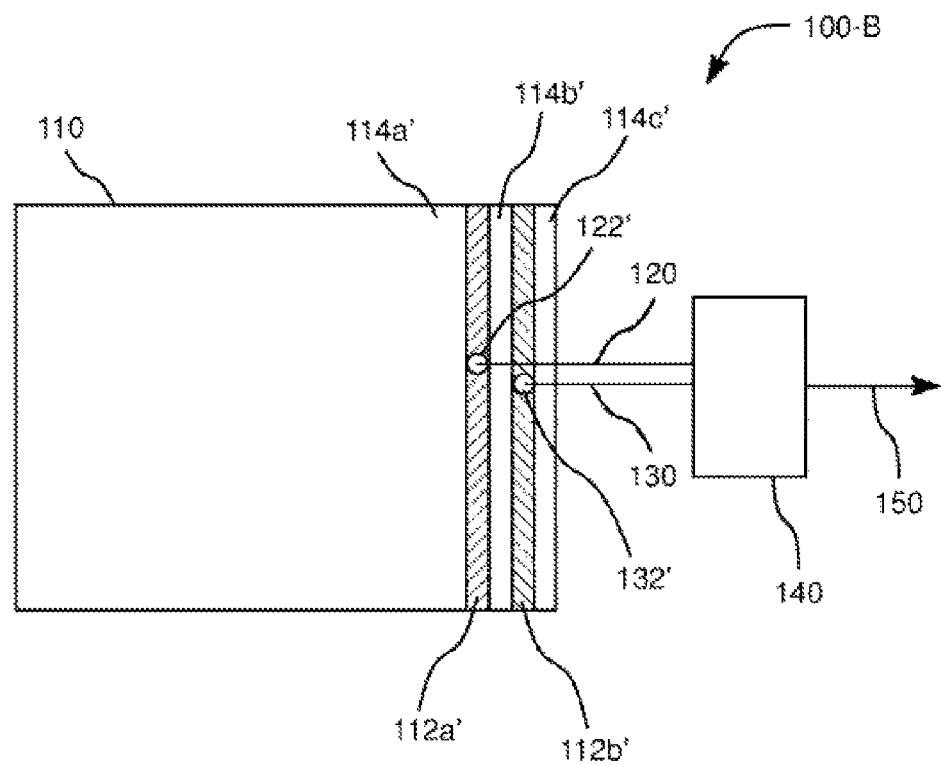
Fig. 2-B

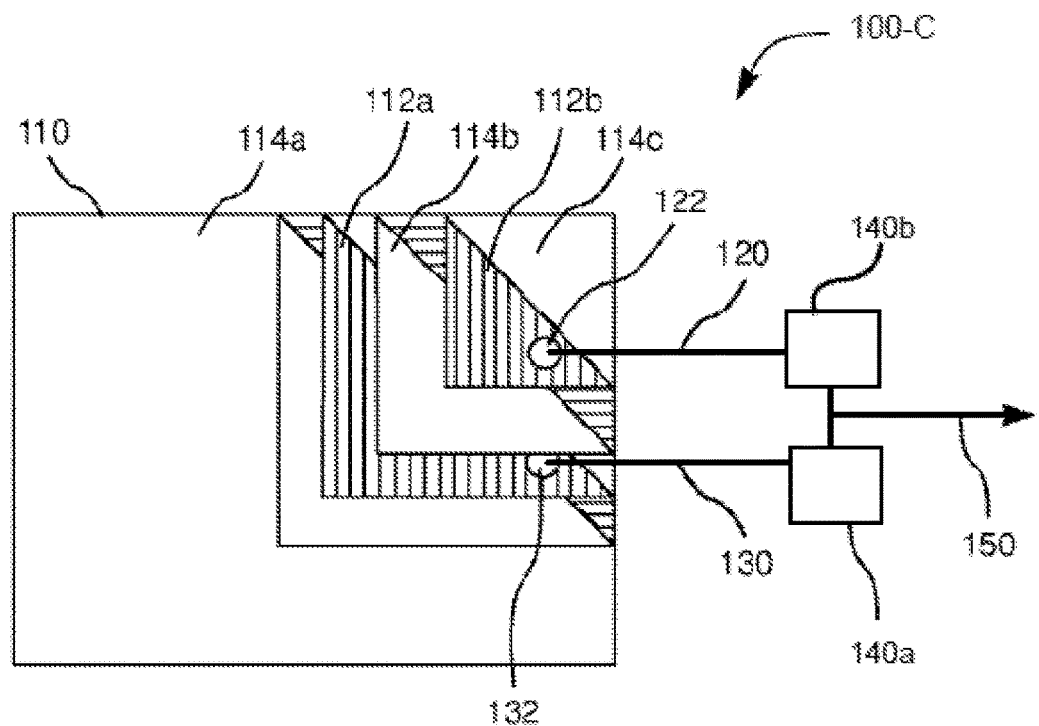
Fig. 2-C
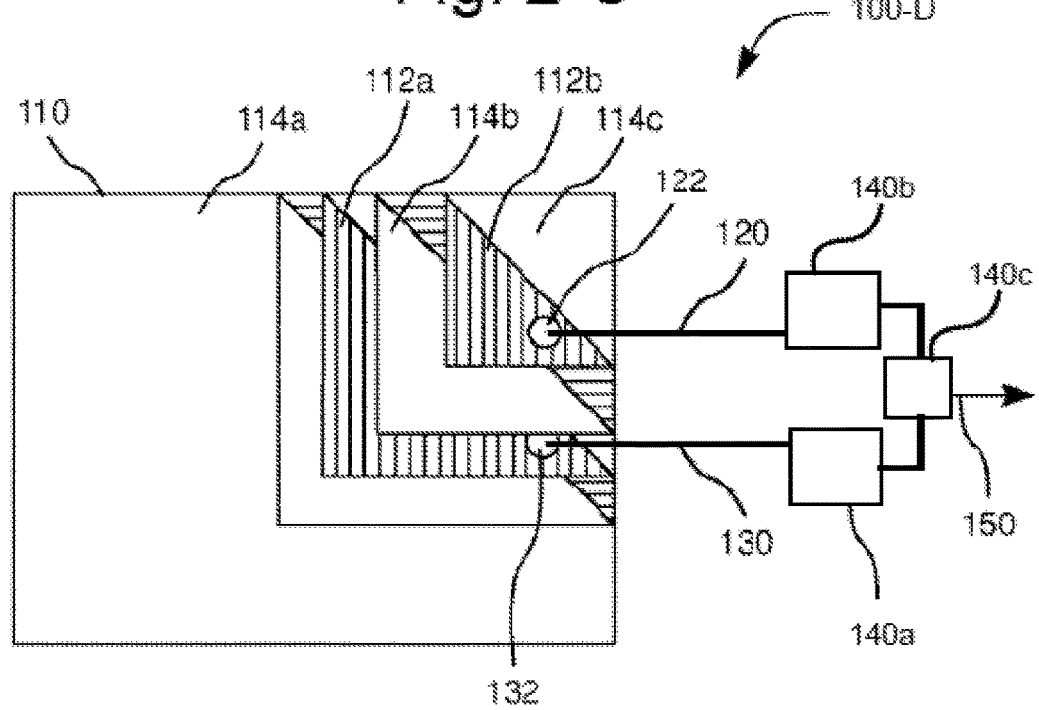
Fig. 2-D

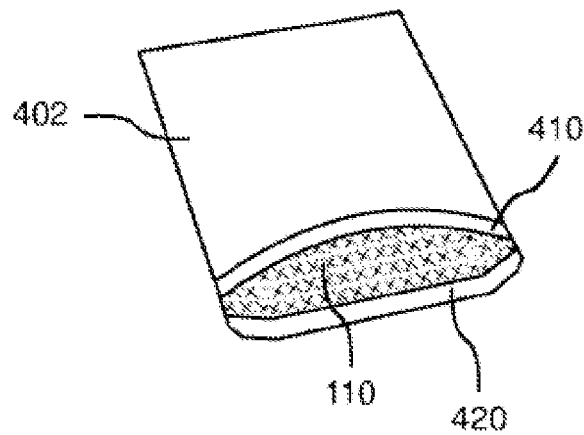
Fig. 4-A
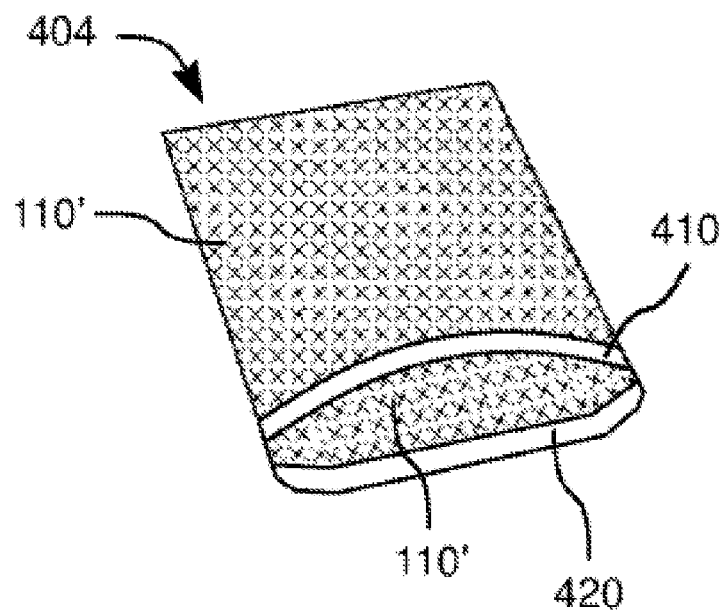
Fig. 4-B

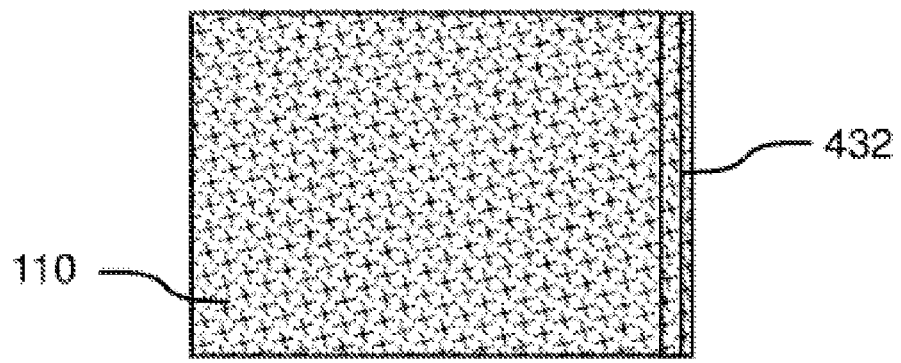
Fig. 4-C
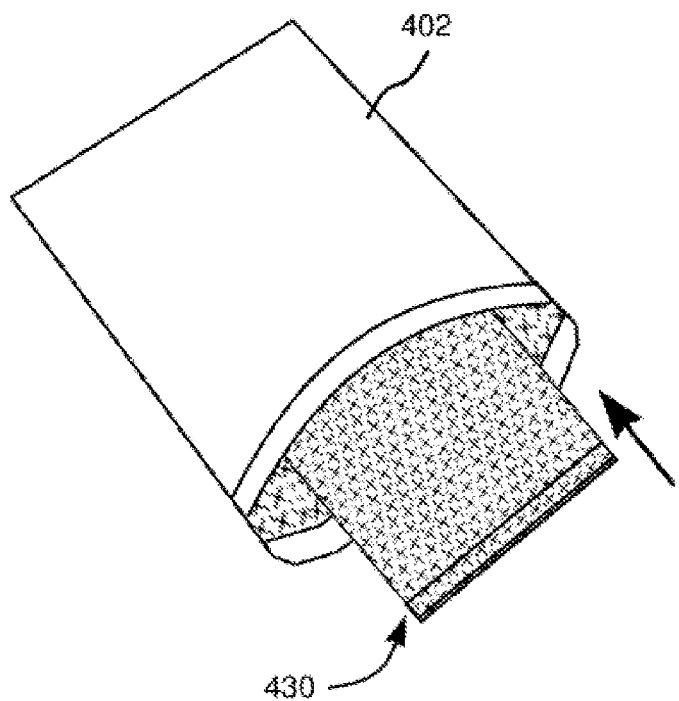
Fig. 4-D

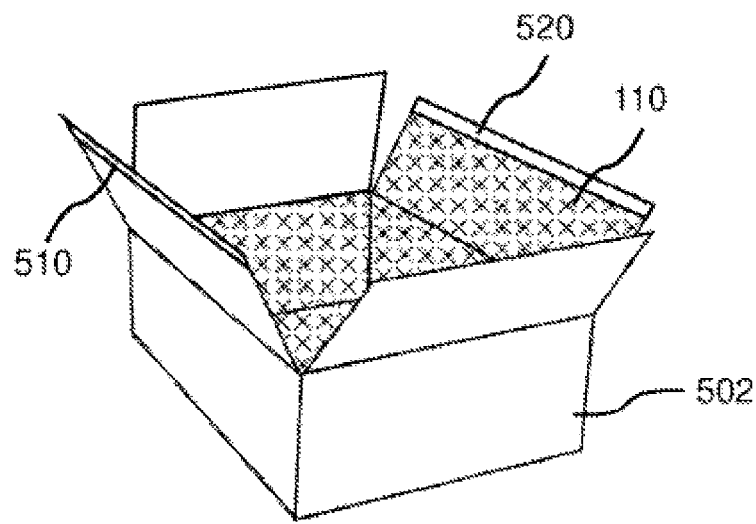
Fig. 5-A
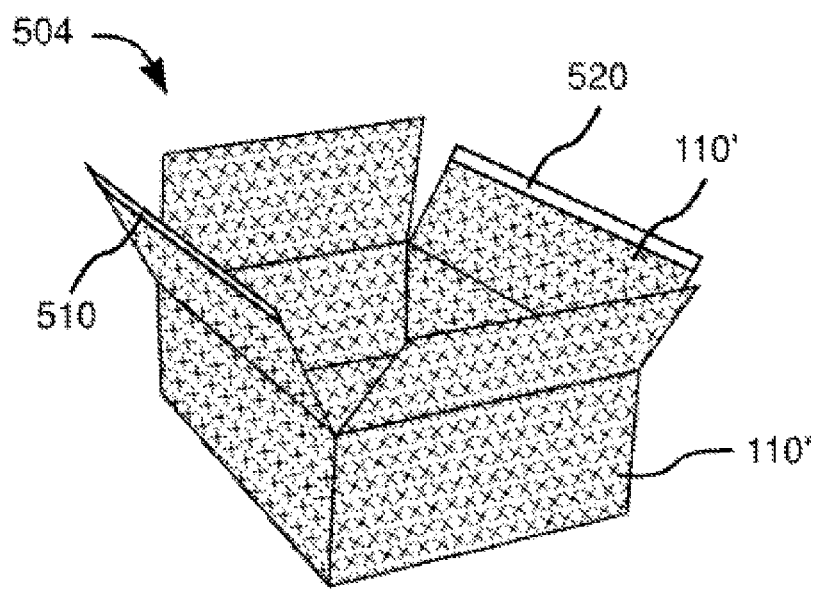
Fig. 5-B

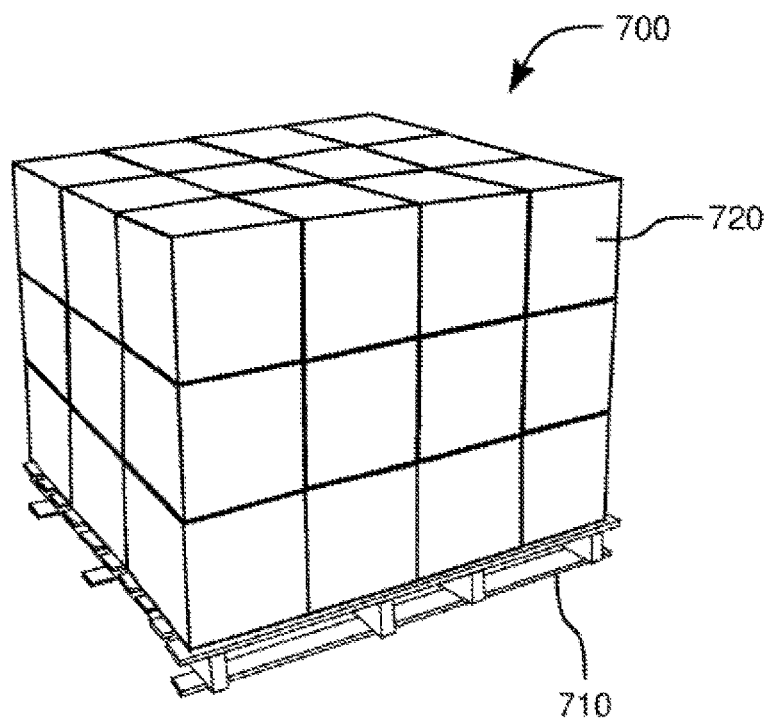
Fig. 7-A
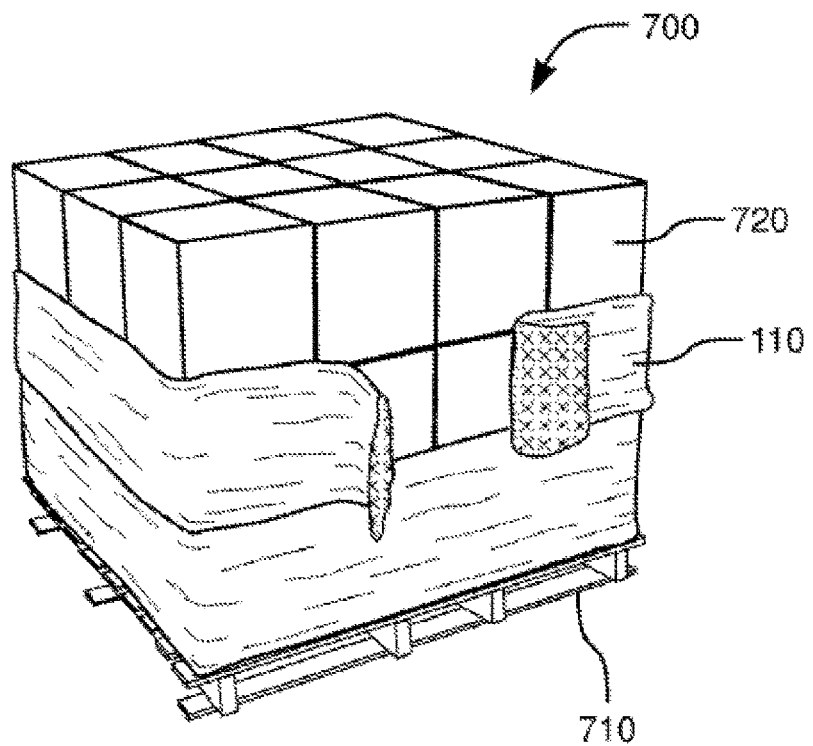
Fig. 7-B

MICROPROCESSOR-CONTROLLED TAMPER DETECTION SYSTEM

CROSS-REFERENCE TO RELATED APPLICATIONS

The instant application is a continuation-in-part of U.S. Nonprovisional application Ser. No. 15/239,744, entitled "Microprocessor-Controlled Tamper Detection System," filed Aug. 17, 2016. U.S. Ser. No. 15/239,744 claims the benefit of U.S. Provisional Application No. 62/233,662, entitled "Microprocessor-Controlled Tamper Detection System," filed Sep. 28, 2015, and of U.S. Provisional Application No. 62/206,596, entitled "Microprocessor-Controlled Tamper Detection System," filed Aug. 18, 2015.

BACKGROUND OF THE INVENTION

Tamper-evident techniques are used in the process of product packaging and labelling, especially in cases where it is vital to know whether or not a product has been altered, damaged, or tampered with. The problem of tamper detection has been solved in many ways. For example, jars of food are packed with bubble-top lids that pop out when the jar is opened. Unfortunately, such tamper-resistant jars can be resealed with seals apparently intact if closed under elevated pressure. The removal of plastic wrap around all or a portion of a container is often used to detect opening and possible tampering. Break-away components of seals or lids that cannot be reattached are also in common use to detect the opening of containers. More complex tamper evident technologies include security tapes, security labels, and RFID tags. Multiple layers or redundant indicators are often used because it is more difficult to defeat multiple tamper evident indicators. Radio-controlled incendiary dye pack device are used by banks to permanently mark money and bank robbers with dye after robberies. Most security products can be defeated by a knowledgeable person with sufficient time and access to specialized tools and materials. Existing methods do not adequately detect small punctures and other forms of tampering that are difficult to see. Current tamper evident methods do not provide information on a time at which tampering occurs, where on a package tampering has occurred, or where during transport tampering has occurred nor do they provide means for detecting multiple tampering events at different times on the same package. It is also desirable for a tamper evident system to have a form of redundancy in case an essential component fails.

The present invention overcomes the limitations and solves problems associated with existing tamper-evident products and methods by providing for a microprocessor-controlled tamper detection system and method for detection of tampering or damage to a package, container, or anything that needs to remain secure. Additionally or alternatively, the system and method may initiate countermeasures in response to the detection of possible tampering.

BRIEF SUMMARY OF THE INVENTION

According to one aspect of the invention, a microprocessor controlled system is provided for monitoring a package or container to detect unwanted tampering, record one or more parameters related to tampering, and optionally initiate one or more countermeasures in response to tampering. The system comprises a layered composite material comprising two isolated conducting layers and a microprocessor connected to the conducting layers and programmed for tamper detection and monitoring. One or more microprocessors detects evidence of tampering by sensing a measured change in an electrical property, such as impedance, between the two isolated conducting layers. A potential may be provided across the two isolated conducting layers by a dedicated power supply or by a power supply of one or more microprocessors.

In another aspect of the invention, a tamper detection method provides for detection of tampering and/or its prevention, and optionally one or more countermeasures. Upon sealing an article, a package, or the like within a layered composite material comprising two isolated conducting layers, a potential is applied between the two conducting layers and one or more microprocessors connected to the conducting layers arm the system and a clock function begins. The microprocessor serial number and sealing time are recorded and stored. If the package is punctured, cut, or otherwise damaged in route, a change in an impedance or other electrical property measured between the two conductive layers is measured and recorded by the microprocessor in an event log as a possible tampering event and a reset function is activated for the next potential event. A user may interrogate the package and download the available event log upon receipt of the package and/or en route. Knowledge of the package transit route provides for comparison with elapsed time and calculation of the location of any tampering or damage.

According to one embodiment, the system comprises a layered composite material comprising first and second flexible conductive layers separated by a flexible inner non-conductive layer. The first and second conductive layers and inner non-conductive layer are contained within two outer non-conductive layers. Each of the respective inner and outer non-conductive layers may be embodied as a thin polyester film so that the layered composite material provides flexibility for enclosure and containment of one or more items. A first thin film microprocessor is positioned within a portion of the layered composite material and is electrically coupled to the first conductive layer. A second thin film microprocessor is positioned within a portion of the layered composite material and is electrically coupled to the second conductive layer. The first and second microprocessors are electrically coupled to each other to form an electrical circuit that is complete except for a break between the first and second conductive layers. One or more programs for execution by the first and/or second microprocessor are configured to arm the system upon the one or more items being sealed within the layered composite material and, upon detection of a change in the electrical properties of the circuit, to record a detected event for evidence of tampering in an event log. The event log preferably includes the time of the event and may include other available data such as the location on the composite material of the tampering and/or GPS coordinates at the time of tampering. Upon recording the detected event, the system may be reset for possible detection of a future event and may additionally or alternatively initiate a countermeasure in response to detected tampering.

In one embodiment, each non-conductive layer comprises biaxially-oriented polyethylene terephthalate (BoPET). In another embodiment, only one of the non-conductive layers comprises BoPET. In yet another embodiment, two of the non-conductive layers comprises BoPET.

One or both flexible conductive layers may be a metal foil. The metal foil may comprise, for example gold, aluminium, an aluminium alloy, indium tin oxide or combinations of these. One or both of the flexible conductive layers may be embodied as a thin film metalized layer deposited onto a surface of a non-conducting flexible layer. One or both of the flexible conductive layers may be embodied as a metalized layer that has been sprayed onto a surface of a non-conducting flexible layer. The non-conductive layers may comprise or consist of BoPET.

BRIEF DESCRIPTION OF THE DRAWINGS

The elements of the drawings are not necessarily to scale relative to each other, with emphasis placed instead upon clearly illustrating the principles of the disclosure. Like reference numerals designate corresponding parts throughout the several views of the drawings in which:

FIG. 2-A is a circuit schematic illustration of composite and conductive layers of the tamper detection system of FIG. 1;

FIG. 2-B is a circuit schematic illustration of an arrangement of composite and conductive layers of the tamper detection system;

FIG. 2-C is a schematic drawing of a tamper detection system comprising two microprocessors.

FIG. 2-D is a schematic drawing of a tamper detection system comprising three microprocessors.

FIG. 4-A is an illustration of a shipping envelope that includes the tamper detection system;

FIG. 4-B is an illustration of an alternate embodiment of a tamper detection system that is a shipping envelope;

FIG. 4-C is an illustration of an alternate embodiment of a tamper detection system that is a pouch container;

FIG. 4-D is an illustration of an alternate embodiment utilizing a tamper detection system pouch within a shipping envelope;

FIG. 5-A is an illustration of a shipping box that includes the tamper detection system;

FIG. 5-B is an illustration of an alternate embodiment of a shipping box that is a tamper detection system;

FIG. 7-A is an illustration of a pallet of boxes having contents for shipping;

FIG. 7-B is an illustration of a pallet of boxes partially wrapped by tamper detection system packaging;

DETAILED DESCRIPTION OF THE INVENTION

All art specific terms used herein are intended to have their art-accepted meanings in the context of the description unless otherwise indicated. All non art specific terms are intended to have their plain language meaning in the context of the description unless otherwise indicated.

A microprocessor-controlled system is provided for monitoring a package, container, or other material wrapped in film-type packaging, for detecting unwanted tampering, recording parameters related to the tampering, and optionally for initiating countermeasures in response to the tampering.

The tamper detection system provides for detection of tampering more-so than its prevention, although countermeasures against, or in response to, tampering are provided for some embodiments. Countermeasures may include radio frequency alert for a tracking signal, or destruction or marking of package contents. Such countermeasures may include, for example, dye bombs to mark a currency with ink for ease of future detection and/or tracking of the currency and/or the purveyors of the tampering or theft of the currency.

Figure 1:
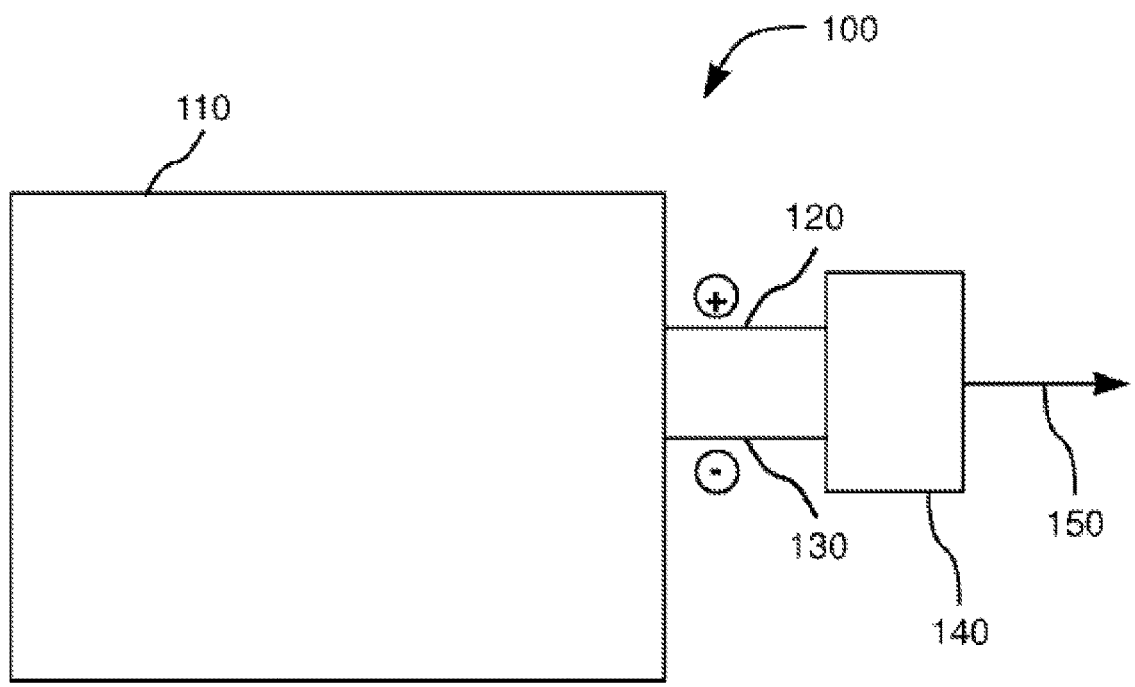
FIG. 1 is an illustration of a tamper detection system according to the present invention.

FIG. 1 is an illustration of a microprocessor-controlled tamper detection system 100 for monitoring and detection of unwanted tampering with the contents of a shipping package or any other container for which there is a desire for protection of the contents from unwanted tampering. FIG. 2-A is a circuit schematic illustration of non-conducting and conductive layers that make up an embodiment of the tamper detection system 100-A. FIG. 2-B is a circuit schematic illustration for an alternate arrangement of composite and conductive layers that make up an alternative embodiment of the tamper detection system 100-B.

The tamper detection system 100 in its most basic form includes a layered composite material 110 electrically coupled to a microprocessor 140 via lead attachments 120 and 130 and terminals 122 and 132, respectively, within the layered composite material 110. The microprocessor 140 may communicate an output signal 150 via any number of standard wired and/or wireless communication means and protocols, such as BlueTooth, ZigBee, NFC, RFID WiFi, USB, RS232 port and/or RJ45 port connections. An electrical potential is provided between terminals 122 and 132, for example by one or more batteries within the layered composite material 110 and connected to the electrical circuit that is broken only by the middle nonconducting layer 114b. The system may comprise "printed batteries" and ultra thin microprocessors in a film of silicone ribbon to make the power supply and the microprocessor 140 hard to detect by simple feel or touch. Additionally or alternatively, the battery systems within the tamper detection system 100 may have a duty life proportional to use. Envelopes and packages intended for short- or near-term delivery have typical service duration on the order of weeks. Larger and/or long-term shipping or storage containers are provided with capability to last for months or years according to the desired use.

Each microprocessor is uniquely identified with an embedded serial number identifier as a countermeasure against replacement by a seemingly identical system 100. Unwrapping an object sealed via the tamper detection system 100 and then resealing in a new seemingly identical package will reveal on receipt and interrogation of the package that a swap has occurred because the serial number of the microprocessor will not match that of the original.

The microprocessor-controlled tamper detection system 100 detects if and when a secured package or container has been compromised by tampering by detecting a measured change in an impedance in a circuit comprising two conducting layers of the composite material. The tamper detection system 100 is made from lightweight composite materials to provide security for the package. The tamper detection system 100 optionally provides for capture of data via the microprocessor 140 that records the exact location of the breach, as well as other information, and may additionally or alternatively trigger a specified predetermined action in response.

In one embodiment, the layered composite material 110 is made from two conductive layers 112a and 112b separated by an insulating or nonconductive layer 114b and sandwiched between insulating or nonconductive layers 114a and 114c. In one embodiment, the conductive layers 112a and 112b are formed from a metal foil. The conductive layers 112 and 112b can be formed from any metallic material having sufficient conductivity and, in this embodiment, that can be made suitably flexible while maintaining its conductivity. Examples of such materials include gold, aluminum, aluminum alloys, and indium tin oxide. In one embodiment, at least one non-conductive layer is embodied as a metalized layer deposited onto a surface of biaxially-oriented polyethylene terephthalate (BoPET).

In the illustrated embodiment 100-A of FIG. 2-A, a first conductive layer 112a is compressed between a first non-conductive layer 114a and a second nonconductive layer 114b. A second conductive layer 112b is compressed between the second nonconductive layer 114b and a third nonconductive layer 114c. The first conductive layer 112a is electrically connected to microprocessor 140 via terminal 132 and lead 130. The second conductive layer 112b is electrically connected to microprocessor 140 via terminal 122 and lead 120. One or more batteries may be incorporated into the microprocessor to provide power for the processor and also an electrical potential between the two terminals. Additionally or alternatively one or more batteries may be located elsewhere and connected to the microprocessor 140 to provide power to the microprocessor on the same or a separate circuit as used to produce a potential between the terminals 122 and 132. In the event of tampering, such as puncturing, tearing, or the application of other forces acting on the nonconducting layer 114b will damage the nonconducting layer 114b and change the impedance measured between the conductive layers 112a and 112b and cause the microprocessor 140 to note and record a tamper event.

FIG. 2-B illustrates an alternative embodiment 100-B of the microprocessor-controlled tamper detection system in which the composite material 110 includes layers that are tiered so that the nonconductive layers 114a, 114b, and 114c along with the conductive layers 112a and 112b all exposed near the same point for ease in connecting the leads 120 and 130 to terminals 122' and 132'.

In various exemplary embodiments, the nonconductive layers 114a, 114b, and 114c are polyester films manufactured and stretched to provide a high tensile strength. One commonly available form of such a material is biaxially-oriented polyethylene terephthalate (BoPET), which is a polyester film made from stretched polyethylene terephthalate (PET). PET provides high tensile strength, chemical and dimensional stability, transparency, reflectivity, gas and aroma barrier properties, in addition to the desired electrical insulation capabilities. One brand name for BoPET is Mylar®.

In some instances, BoPET may be metalized by depositing a thin film of evaporated gold, aluminum, or another metal onto the BoPET surface by a vapor deposition technique to create a conductive layer 112a or 112b on one of the nonconducting BoPET layers. Conductive indium tin oxide or other coatings can also be applied via sputter deposition or spray coating, for example. Conductive layers 112a and 112b can be formed from any metallic material having sufficient conductivity, and that can be made suitably flexible while maintaining its conductivity. In the present disclosure and for simplicity of explanation, the term "aluminized BoPET" is used for an exemplary thin film material coated on one side with aluminum. A sometimes common equivalent and comparable term is aluminized Mylar®. Alternatively or additionally, other flexible synthetic films may be coated on one-side with a conductor and on the opposite side with an insulator to produce conducting and nonconducting layers in the composite layer material 110.

Wrapping or sealing an object in aluminized BoPET provides slightly different results than various aluminum alloy powders. Pure aluminum is preferable to aluminum-bronze or aluminum-silicon. In one embodiment, a desirable BoPET and powder coating thickness is approximately 50 micrometers. Uniformity of the aluminum powder coating is important for maintaining consistent conductivity of the slightly stretched packaging material. One advantage of coated BoPET over metal foil is weight and flexibility. Another advantage is that only one side of the material need be conductive. This provides for a reduced total wrap thickness.

The five functional layers 114a, 112a, 114b, 112b, 114c may be embodied as various combinations comprising a conducting layer and a nonconducting layer embodied as a unitary structural layer. For example, while the illustrated example includes a complete BoPET laminate having five layers, an embodiment of the tamper detection system 100 can also be made from a complete laminate having three layers. A three layer BoPET laminate may comprise an exterior nonconductive outer layer 114a upon which a conductive inner face is deposited, an interior nonconductive layer 114b, and an exterior nonconductive layer upon which a conductive inner face has been deposited.

In another embodiment, a plain metal foil is utilized and includes four layers of material rather than three. In such an embodiment, the four layers may comprise one layer of aluminized BoPET to form a structurally unitary layer comprising 114a and 112a, for example, a nonconductive layer 114b, a conducting layer 112b, and a nonconducting layer outer layer 114c.

In one exemplary embodiment of the tamper detection system 100, the three nonconductive layers 114a, 114b, and 114c are provided by BoPET film layers that separate the conductive layers 112 and 112b from each other. Together, the nonconductive layers 114a, 114b, and 114c and the conductive layers 112 and 112b form the layered composite material 110 or packaging. The tamper detection system 100, however, can be constructed from any number of layers so long as those layers include insulating or nonconductive layers 114a, 114b, and 114c to separate the conductive layers 112 and 112b. Such layers can be constructed from five individual layers, or from a group of multi-sided materials having, for example, insulating material on one side and conductive material on the other side, or any other such arrangement to construct the arrangement described above. The layers can be constructed and/or assembled from any type material that can be utilized to form the respective conductive or insulating layer. In one embodiment, the respective layers are formed from a spray-on type material that is utilized to apply the respective layer, as noted above. In one embodiment, a conductive layer is applied via spraying the conductive material to a BoPET material. Another BoPET material layer is applied adjacent the spray-on conductive layer. The process is repeatable to provide the desired number of conductive and non-conductive layers necessary for the particular situation.

In another embodiment, a non-conductive or insulating layer is applied via spraying the material in the desired location, then a conductive layer is applied via spraying over the insulating layer. Additional layers of non-conductive, conductive, and then non-conductive materials are sprayed respectively until the desired number of layers are applied.

FIG. 2-C discloses an embodiment 100-C of a tamper evident system similar to that shown in FIG. 2-A except that the first conductive layer 112a is electrically connected to a first microprocessor 140a via terminal 132 and lead 130. The second conductive layer 112b is electrically connected to a second microprocessor 140b via terminal 122 and lead 120 and the first and second microprocessors 140a and 140b are electrically coupled to one another. Programming for detecting, reporting, and storing data associated with a tamper event may be present in one or both of first and second microprocessors 140a and 140b. If present in both microprocessors, the system may configured to provide the technical advantage of providing a redundancy such that damage to one of the microprocessors does not interrupt the function of the system. The microprocessors may additionally be programmed to record an event that damages one of the microprocessors. Either or both of the microprocessors 140a and 140b may comprise the functionality for communication via data transmission to 150 a user. The technical features of embodiment 100-C may be combined with any one or combination of materials disclosed above with respect to structural and functional properties such as the total number of layers, the composition of layers being structurally and functionally distinct or the composition of unitary structures providing more than one function.

FIG. 2-D discloses an embodiment 100-D of a tamper evident system similar to that shown in FIG. 2-C except that the first and second microprocessors 140a and 140b are electrically coupled to a third microprocessor 140c. Programming for detecting, reporting, and storing data associated with a tamper event may be present in any one, two or three of the microprocessors 140a-c. Similarly the microprocessors may be configured to provide a double or triple redundancy for any single or combination of functions performed by the system. One or more of the microprocessors may additionally be programmed to record an event that damages one or both of the other microprocessors. Any single microprocessor or combination of two or three of the microprocessors may be programmed to provide communication via data transmission to 150 a user.

Figure 3:
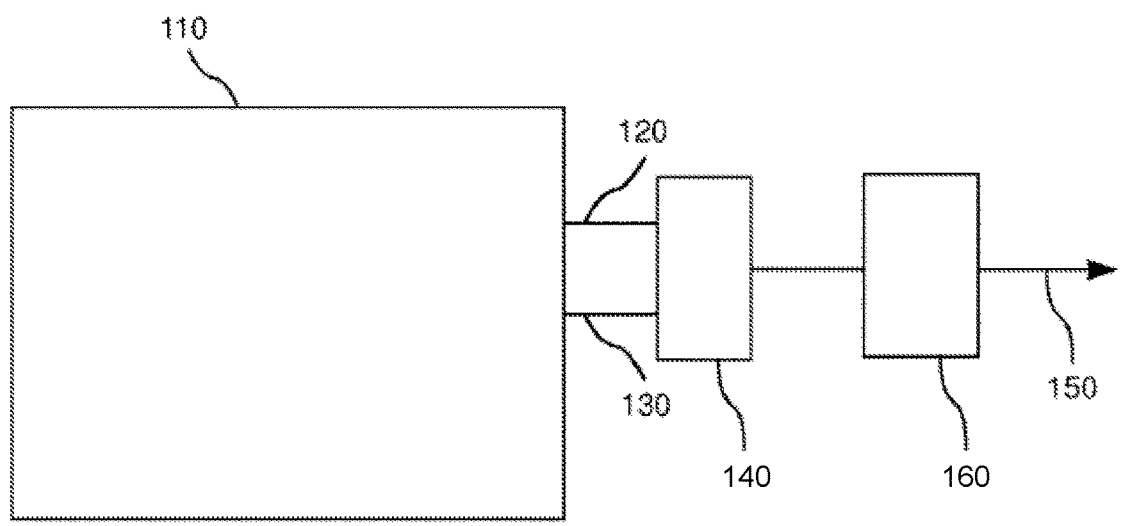
FIG. 3 is an illustration of a tamper detection system with an additional sensor as part of the circuit.

FIG. 3 is an illustration of a tamper detection system comprising a sensor 160 included as part of the circuit. The sensor 160 may be located anywhere within the layered composite material 110 or it may be attached thereto. The sensor may be electrically coupled to the microprocessor 140 and its power supply or the sensor 160 may have its own power supply and communicate wirelessly with the microprocessor 140. The sensor 160 may be incorporated into and integral with the layered composite material 110 such that the sensor 160 is undetectable by a visual inspection of the tamper detection system. One or more additional sensors 160 may be included in various embodiments of tamper detection systems 100A-D to provide additional monitoring and or detection capabilities and associated data recording. The microprocessor 140 may, for example, record one or more of sensor information on temperature, barometric pressure, altitude, moisture, acceleration, and crush force provided by one or more sensors 160. Utilizing this collected information, the microprocessor 140 can issue or relay a command to take various type defensive or offensive actions. For embodiments 100-C and 100-D, the presence of multiple microprocessors allows for redundancy of function between microprocessors and/or separation of functions between microprocessors.

The microprocessor-controlled tamper detection systems 100-100D and additional embodiments comprising various disclosed combinations of features comprise an inexpensive, disposable, composite material. The tamper detection systems disclosed herein may be incorporated into common items such as envelopes, boxes, and bags and, if incorporated on the inside of a box, envelope or other container, may be completely invisible from the outside. Piercing, cutting, tearing or otherwise damaging the composite material causes the microprocessor(s) to quietly record the time and date of the tampering, and optionally to illuminate a telltale LED light, or to trigger a countermeasure action, i.e. dye bomb, radio signal, etc., if so programmed. Any of the disclose embodiments of the tamper detection system may provide specialized applications that detect temperature changes, pressure changes, crushing force, and or acceleration experienced by the package. The various described embodiments are particularly useful for shipping pharmaceuticals, legal evidence, confidential documents, and other items that require greater than normal security and accountability.

The tamper detection systems 100A-D described herein can be used to provide tamper and damage detection security even for large objects such as motor vehicles, space craft, airplanes, boxcars, tankers, buildings, doors, hatches, body bags, evidence lockers, and crates. The tamper detection system 100 provides the capability to provide tamper and damage detection for anything that can be sealed and remain secure in the knowledge that there has been no tampering. An entire object need not be sealed within the layered composite material 110. For example, the layered composite material 110 can be used to detect tampering with or opening of a door to a locker, a hatch on a ship or submarine or the canopy of an airplane, for example. In these instances, the system 100 is preferably configured to measure an impedance between the two conducting layers 112a and 112b and arm when the door, hatch or canopy is closed. The layered composite material 110 may be attached to the inner hull of a ship or submarine or to the fuselage of an aircraft so that the system 100 detects any piercing of the hull or fuselage. The layered composite material 110 may be attached to helmets, flight suits or space suits to detect minute piercings. Conducting and nonconducting layers may be sprayed onto interior and/or internal surfaces of vessels such as spacecraft, aircraft, watercraft, or submarines to provide for detection of penetration through a hull, fuselage, containment wall, or other internal or external barrier.

The tamper detection system 100 operates effectively as a switch, triggered by altering an electrical property, such as impedance, in a flexible packaging wrap. The microprocessor(s) 140 monitors the composite material 110. Depending on the application, the electrical alteration can be a dead short in the packaging (bridging between two conductive layers as in a penetration through at least a portion of the packaging), a capacitive discharge from an electrical layer to ground (scraping away the outside insulating layer), or tampering with sensors that changes conductivity or other electrical properties.

The tamper detection system 100A-D may be a sealed, monitored, sensor system in which a change beyond a specified allowable parameter is measured by the microprocessor and an action is taken as a result. For example, a penetration of the exterior insulating layer and cutting or applying pressure to just one conductive layer with a metallic or nonmetallic tool can cause such a change.

Temperature, interior and exterior atmospheric pressures, and interior crush sensors may also be monitored by the microprocessor 140. The triggering methods chosen are based on use and cost considerations. The composite packaging material 110 and the microprocessor units 140 are disposable and represent effective but very low cost security. It should be appreciated that the use of additional sensors provide for multiple configurations and variations depending on the particular requirements.

As noted above, the tamper detection system provides for detection of tampering more-so than its prevention, although countermeasures against, or in response to, tampering are provided for some embodiments. In some embodiments, the system comprises a radio transmitter controlled by one or more microprocessors to send a radio frequency alert as a tracking signal, or even destroy or mark the package contents In one embodiment, a dye bomb is activated to mark a currency with ink for ease in future detection and/or tracking of the currency and/or the purveyors of the tampering or theft of the currency. In another embodiment, an alert is transmitted via available communication channels, such as WiFi, WAN, LAN, or available cellular and other communication methods. The alert can be as simple as a text message to a prescribed number or location, an email communication to one or more parties, or as complex as a telemetry data dump to a designated recipient or recipients. The tamper detection system 100A-D may provide for triggering a specified predetermined action in response to a breach detected by one or more sensors 160, such as recording information provided by a sensor 160 and relay a command for defensive or offensive actions.

FIG. 4-A is an illustration of a tamper detection system 100-100D applied to the interior of a shipping envelope 402. The tamper detection system is located inside a paper or paper type mailing envelope 402 that includes an interior interleaving of insulating and conductive layers that form the composite material 110. A double-flap peel-destructive flap 410, 420 is utilized to activate the interior microprocessor 140 upon sealing of the envelope 402. The interior microprocessor 140 may alternatively be activated in any manner that is customarily utilized for activating or applying power to a microprocessor, such as a switch, or a wireless signal. It will be readily appreciated that one concern for activation of the tamper detection system is that the interior microprocessor 140 is activated and initialized so that monitoring the package for tamper detection is initiated when desired and not earlier or later. The tamper detection system applied in FIG. 4-A may be, for example, any of 100-100D with any combination of the microprocessors being activated by the double-flap peel-destructive flap 410. A LED external to the package may be functionally (physically and/or wirelessly) connected to one or more microprocessors in the system to provide a visible indication of tampering or damage. Other embodiments may additionally or alternatively include audible, olfactory, and/or other visual methodologies for signaling that tampering has taken place.

FIG. 4-B is an illustration of an alternate embodiment of a tamper detection system 100-100D that is embodied as a shipping envelope 404 that comprises an interleaving of insulating and conductive layers that is formed into an envelope 404. That is, the envelope 404 is made from the composite material 110' itself. At least one of the insulating and/or conductive layers also provides the rigidity necessary for the particular envelope design. Again, embodiments comprising one, two, or three microprocessors may be configured in this way. Any of the nonconducting layers may be made to have the structure or rigidity necessary for the envelope 404.

FIG. 4-C is an illustration of an embodiment of a tamper detection system that is also a pouch container 430 with a typical shipping type pouch configuration often used for the shipping of sensitive materials or products for which it is desired that the product be unopened. Such materials might include printed circuit boards, hard drives, USB devices, electronic products, compact discs, DVDs, evidence, medical products and devices, prescription drugs, pharmaceuticals, and many other products. Of course, the particular products that are often shipped in such pouches are many and varied. Again, the composite layer may have any of the configurations described herein with respect to 100-100D. The pouch container 430 includes a seal 432 at the open-able end which may be re-sealable or non re-sealable. In the illustrated embodiment, the pouch container 430 is made from an interleaving of the insulating and conductive layers of the composite material 110. That is, the pouch container 430 is made from the composite material 110. In the illustrated embodiment, and similarly as above, a specialized double-flap peel-destructive flap is utilized to seal the contents within and to trigger the interior microprocessor(s) 140, 140a, 140b, and/or 140c for monitoring upon sealing of the pouch container 430. The interior microprocessor 140 may be activated in any manner that is customarily utilized for activating or applying power to a microprocessor, such as a switch, a wireless signal, or completing a circuit in some other manner. It will be readily appreciated that the primary concern for activation of the tamper detection system is that one or more interior microprocessors are activated and initialized so that monitoring the package for tamper detection is initiated. The pouch container 430 can be constructed from any number of layers so long as those layers include three insulating or nonconductive layers to separate two conductive layers electrically coupled to one or more processors as described herein. In some embodiments, at least one of the layers provides any additional structure necessary for the pouch and its desired contents.

The invention is not limited to the pouch shaped explicitly described herein and could include any variety of geometric shapes so long as the contents are sealed within and the interior microprocessor(s) 140 is activated for monitoring. A specialized double-flap peel-destructive flap may be used to seal the contents and activate the interior microprocessor 140 need not extend across an entire end of the pouch container 430. A balloon type pouch container 430 may comprise a narrow spout with a relatively smaller size than the end of the pouch for activating and sealing.

FIG. 4-D is an illustration of tamper detection system 100-100D embodied as a pouch 430 placed within a shipping envelope 402. Once the contents requiring tamper detection monitoring are sealed within the pouch 430, the pouch 430 is placed within a shipping envelope 402 for delivery. Multiple pouches may be placed within a shipping envelope 402 or any other type shipping package as space and any other desired shipping constraints allow.

FIG. 5-A is an illustration of a tamper detection system 100-100D embodied as a liner applied to the interior of a shipping box 502. The cardboard shipping box 502 encloses an interior interleaving of insulating and conductive layers that form the composite material 110. A double-flap peel-destructive flap 510, 520 triggers the interior microprocessor 140 upon sealing of the shipping box 502. One or more of the interior microprocessor(s) 140-140c may be activated in any manner that is customarily utilized for activating or applying power to a microprocessor, such as a switch, a wireless signal, or completing a circuit in some other manner. A LED external to the package may be electrically coupled to one or more microprocessors and lit as a visual indication of tampering or damage. As above, one embodiment provides for a single external LED external to the shipping box that is lit by the microprocessor 140 as an indication of shipping or damage. This and other embodiments may additionally or alternatively include audible, olfactory, and/or other visual methodologies for signaling that tampering has taken place.

FIG. 5-B is an illustration of a tamper detection system 100-100D embodied as a shipping box 504. The tamper detection system is made by interleaving insulating and conductive layers into a rigid composite layered material 110' that forms the shipping box 504. That is, the shipping box 504 is made from the composite material 110' itself. At least one of the insulating and/or conductive layers also provides the rigidity necessary for the particular shipping box design. This is an example of a tamper detection system for which the conducting and nonconducting layers need not be flexible and are preferably rigid.

Figure 6:
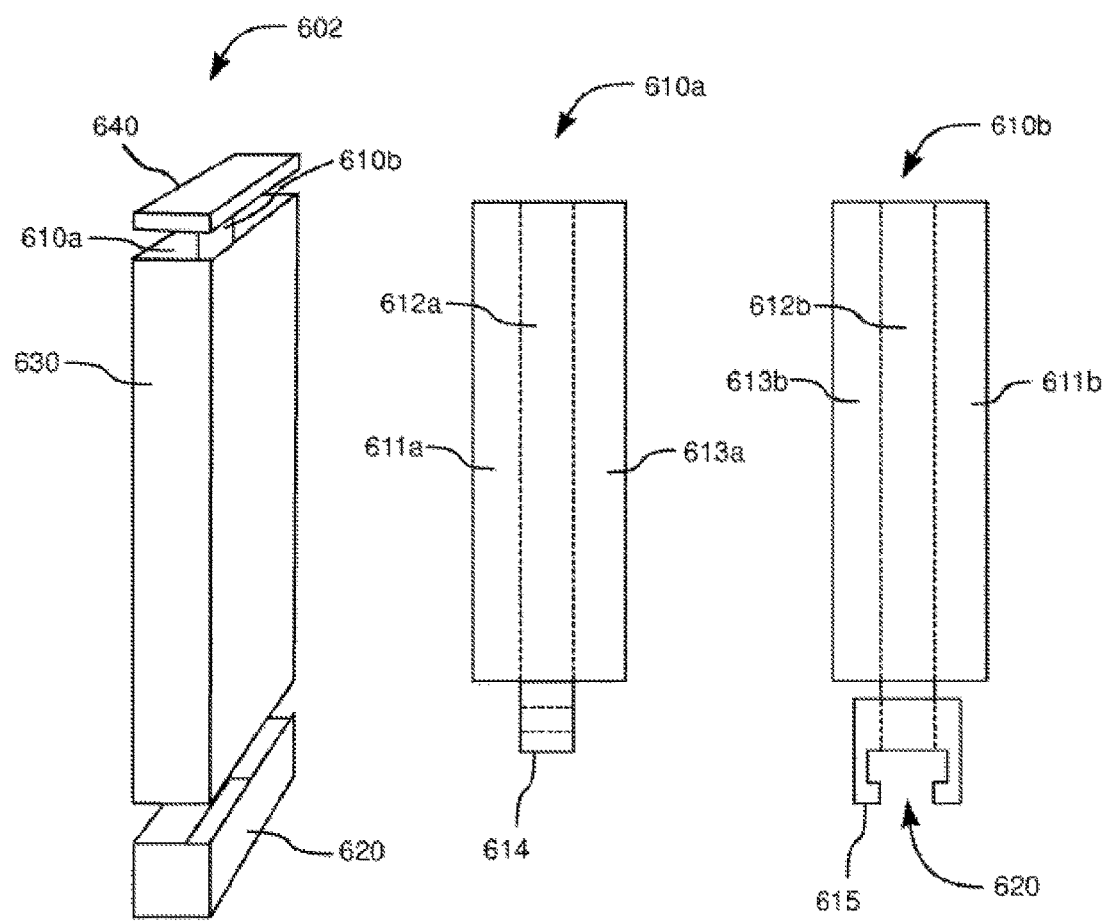
FIG. 6 is an illustration of a magazine cabinet for currency that makes use of the tamper detection system.

FIG. 6 illustrates a tamper detection system 100-100D applied to a magazine cabinet 602 for containing and/or dispensing currency in an ATM machine or currency exchange machine. The magazine cabinet 602 includes a base 620, a main cabinet 630, and a top plate or lid 640. Two layered composite materials 610*a*, 610*b* are attached to the inside of the main cabinet 630. The front 612*a* and back 612*b* of each layered composite material are attached to the front and back (narrow ends visually in the orientation of the illustrated example) respectively of the main cabinet 630. The left sides 611*a*, 611*b* wrap along one edge of the main cabinet 630, and the right sides 613*a*, 613*b* wrap along the opposing edge of the main cabinet 630. Each of the layered composite material 610*a*, 610*b* includes a base fold 614, 615 respectively. The base fold 615 of the back layered composite material 610*b* includes an opening for an ink spray mechanism, for example, as part of a dye bomb. Additional or alternative action mechanisms such as audible, visible, or wireless signals can be provided. Closing the lid 640, completes the circuit to arm the processor(s).

Combination crush and thermal sensors may be adhered at the top, middle, and bottom of the interior walls of the magazine cabinet 602. The sensors are made from a material that will fragment and break the thin, brittle wires embedded inside. Breaking the wires signals the microprocessor(s) 140-140*c* that severe impacts and/or crushing forces are being applied to the magazine. Additionally or alternatively, thermocouple connections may be included with the crush sensors and provide for temperature measurement and detection of changes in temperature within the magazine cabinet 602. Such measurements can be recorded by one or more microprocessors 140-140*c* to track the mean magazine cabinet temperature. The layered composite materials 610*a*, 610*b* cover the inside of the magazine cabinet. Any piercing or cutting causes the two inner conducting layers of metal foil to contact each other and completes the electrical circuit that triggers, for example, an ink jet spray system, or other desired action. The circuit is completed when physical contact occurs between the normally insulated metal foil layers.

The tamper detection system 100-100D may provide for reporting a penetration in a specific area of a package or panel using a grid detection technique. Sector detection may be provided for individual aircraft or spacecraft doors, as well as fuselage or hull sections. Each piece or desired protection section may be equipped with a dedicated tamper detection system 100A-D with each of the tamper detection systems 100 wired to a common microprocessor bus. Grids can be provided in large sheets or panels having square yard or square foot grids, for example. The material may be constructed of many smaller, individually sized tamper detection systems, with each wired to a common microprocessor bus.

Square inch detection may be achieved by printing a complex grid pattern in the conductive layers of the sensors using nonmetallic conductive ink. The two conductive layers are adhered in a specific overlapping manner so that there is no unprotected area. Each square inch section of the grid has an individual reporting circuit, half in one conductive layer, the other half in the other conductive layer. The circuits connect to collector buses that report to one or more microprocessors.

The sensor material can be used in spaced parallel sheets to detect and calculate the trajectory of incoming small arms fire, for example. In such an embodiment targeted structures and other areas subject to hostile fire are provided with the capability to record forensic data of the time and angle of fire. With more advanced microprocessors and/or systems, a return fire azimuth may be calculated by the system. Such an embodiment comprises a variation of the square inch grid-locating configuration described above, with two-inch squares on the outer panel, and one-inch squares on the inner panel. Arranged in parallel, and spaced four to six inches apart, two panels allow precise trajectory calculations as a projectile passes through them.

FIG. 7-A illustrates a pallet of boxes 700 having contents for shipping. FIG. 7-B illustrates the pallet of boxes 700 partially wrapped by a microprocessor-controlled tamper detection system 100-100D comprising a layered composite material 110. Two layers of the layered composite material 110 are wrapped around a portion of the stack of boxes. One layer of composite material 110 is completely wrapped, while a second layer is mostly wrapped but not yet closed around the boxes. The layered composite material 110 of the microprocessor-controlled tamper detection system 100-100D can also be wrapped over the top and/or the bottom of the stack of boxes 720, before or after wrapping around the sides.

Figure 8:
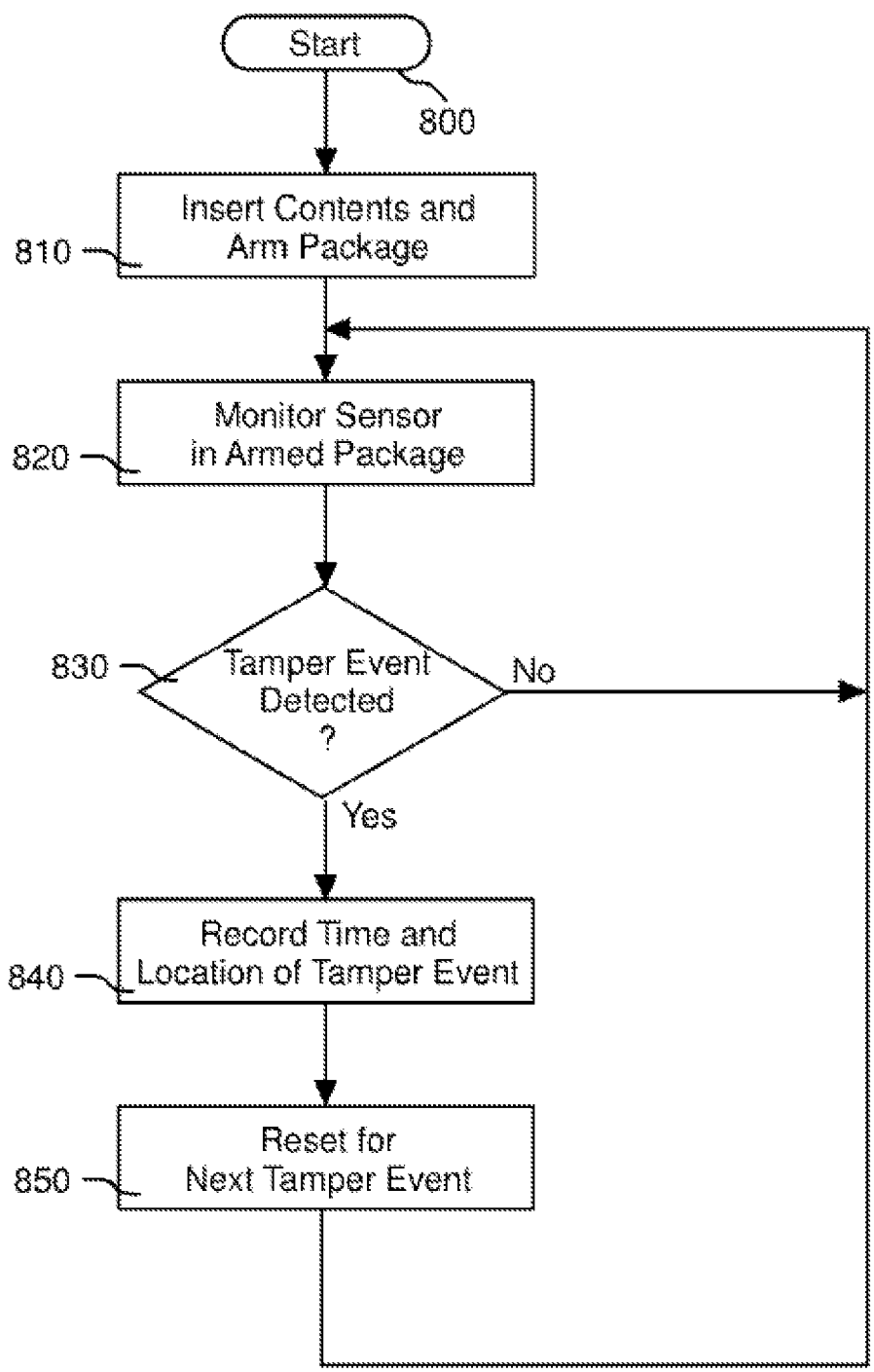
FIG. 8 is a flowchart that illustrates arming and monitoring of a tamper detection system for use with a package.

FIG. 8 is a flowchart illustrating logic for arming and monitoring of a tamper detection system 100-100D for use with a package or other container. Once contents are placed into the container and the package is sealed, the initiation process for arming the package begins at step 810. At step 820, the microprocessor(s) 140 begins monitoring the electrical properties, such as impedance, of a circuit comprising conducting layers 112*a* and 112*b* for an event indicative of tampering. If no tamper event is detected at step 830, the microprocessor maintains a loop beginning at step 820 to continue monitoring for a tamper event.

Once a tamper event is detected at step 830, the processor records the time and location of the tamper event. The microprocessor(s) 140 then resets at step 850 for the next tamper event, and then proceeds back into the loop beginning at step 820 to monitor for new tamper events.

Figure 9:
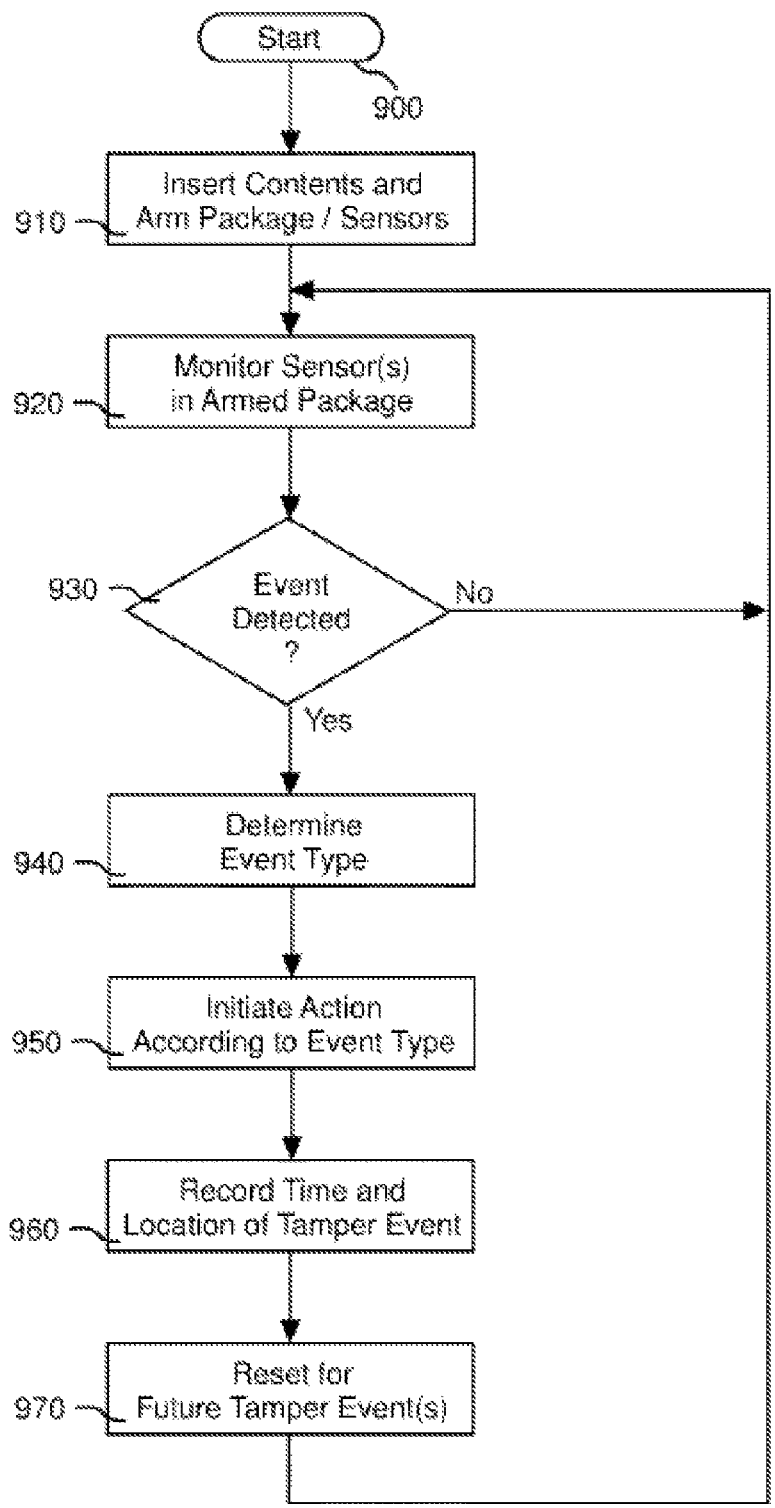
FIG. 9 is a flowchart that further illustrates arming and monitoring a tamper detection system that includes an additional sensor for use with a package.

FIG. 9 is a flowchart illustrating logic for arming and monitoring a tamper detection system 100-100D that includes one or more sensors 160. Once contents are placed into the container and the package is sealed, the initiation process for arming the package begins at step 910. At step 920, the microprocessor(s) 140 begins monitoring for input from the sensor(s) 160. If no sensor detected event is detected at step 930, the microprocessor maintains a loop beginning at step 920 to continue monitoring for a tamper event or other sensor notification.

Once a tamper event is detected at step 930, the microprocessor(s) 140 determines the event type at step 940. Determination of the event type is dependent on the type(s) of sensor(s) in the system. Examples of events include sudden acceleration, temperature change, change in humidity, and exposure to a form of radiation. Any actions required by the particular event type are initiated at step 950. The data related to the tamper and/or other event are recorded along with the time and location at step 960. The microprocessor(s) 140 then resets at step 970 for the next tamper event, and then proceeds back into the loop beginning at step 920 to monitor for new events. For embodiments of the system 100A-D comprising two or three microprocessors 140-140c, the functions performed by a single processor in this example may be distributed between the microprocessors and/or be performed redundantly by the microprocessors.

The invention claimed is:

1. A system for tamper detection, said system comprising:
a layered composite material comprising a first conductive layer separated from a second conductive layer by an inner non-conductive layer, a first non-conductive outer layer in contact with the first conductive layer, and a second non-conductive outer layer in contact with the second conductive layer;
a first microprocessor electrically coupled to the first and second conductive layers;
a second microprocessor electrically coupled to the second conductive layer;
a power supply; and
means for communicating data from the microprocessor to a user
wherein:
said first microprocessor is electrically coupled to the second conductive layer through the second microprocessor;
said first microprocessor is programmed to:
arm the system when a potential is applied between the first and second conductive layers;
upon detecting a change in an electrical property in a circuit comprising the first and second conductive layers, recording a timed tampering event; and
upon recording the tampering event, resetting the system for possible detection of a future event.

2. The system of claim 1, wherein detecting a change in an electrical property comprises detecting a change in an impedance.

3. The system of claim 1, wherein the first and second conductive layers each comprise a metal foil.

4. The system of claim 1, wherein one of the first and second conductive layers comprises a thin film metalized layer deposited onto a surface of one of the first and second outer non-conducting layer or a surface of the inner non-conducting layer.

5. The system of claim 1, wherein the microprocessor is a thin film microprocessor.

6. The system of claim 1, wherein the first and second microprocessors provide complete functional redundancy with respect to each other.

7. The system of claim 1, further comprising a third microprocessor electrically coupled to the first and second microprocessors.

8. The system of claim 1, further comprising a sensor in communication with the microprocessor and wherein the microprocessor received signals from the sensor and stores data derived from said sensor signals.

9. A system for tamper detection, said system comprising:
a layered composite material comprising a first conductive layer separated from a second conductive layer by an inner non-conductive layer, a first non-conductive outer layer in contact with the first conductive layer, and a second non-conductive outer layer in contact with the second conductive layer;
a first microprocessor electrically coupled to the first conductive layer;
a second microprocessor electrically coupled to the second conductive layer and the first microprocessor;
a power supply; and
means for communicating data from the microprocessor to a user
wherein:
the first and second conductive layers and first and second microprocessors are in an electrical circuit that is interrupted only by the inner nonconductive layer;
said first and second microprocessors are individually or collectively programmed to:
arm the system when a potential is applied between the first and second conductive layers;
upon detecting a change in an impedance between the first and second conductive layers, recording a timed tampering event; and
upon recording the tampering event, resetting the system for possible detection of a future event.

10. The system of claim 9, wherein the completion of the circuit comprising the first and second conductive layers and first and second microprocessors causes one or both of the microprocessors to log a time stamped tamper event.

11. The system of claim 9, wherein at least on of the first and second microprocessors is programmed to initiate a countermeasure when a tamper event is recorded.

12. The system of claim 8, wherein said sensor measures temperature, barometric pressure, altitude, moisture, acceleration, crush force, radiation, or combinations thereof.

* * * * *